Figure 1:
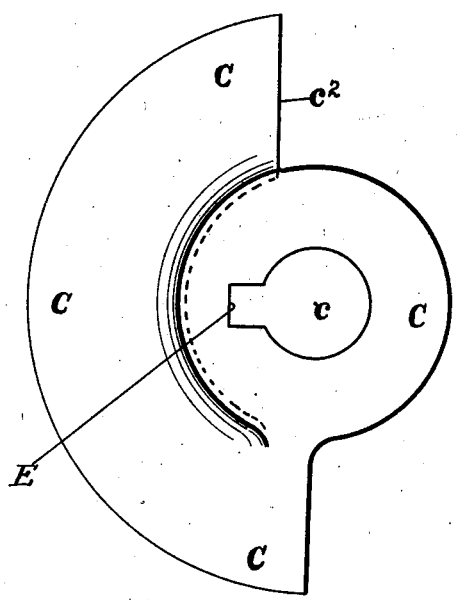

A. W. SIZER.
WORM SCREW OF EXTRUSION AND LIKE PRESSES.
APPLICATION FILED NOV. 6, 1920.

1,384,679.

Patented July 12, 1921.

2 SHEETS—SHEET 1.

Inventor
Albert W. Sizer
by Herbert W. Jenner
Attorney

A. W. SIZER.
WORM SCREW OF EXTRUSION AND LIKE PRESSES.
APPLICATION FILED NOV. 6, 1920.

1,384,679.

Patented July 12, 1921.
2 SHEETS—SHEET 2.

UNITED STATES PATENT OFFICE.

ALBERT WILLIAM SIZER, OF HESSLE, NEAR KINGSTON-UPON-HULL, ENGLAND.

WORM-SCREW OF EXTRUSION AND LIKE PRESSES.

1,384,679. Specification of Letters Patent. Patented July 12, 1921.

Application filed November 6, 1920. Serial No. 422,332.

*To all whom it may concern:*

Be it known that I, ALBERT WILLIAM SIZER, a subject of the King of Great Britain, residing at Hessle, near Kingston-upon-Hull, in the county of York, England, have invented certain new and useful Improvements in or in Connection with the Worm-Screws of Extrusion and like Presses, of which the following is a specification.

This invention has reference to worm screws of extrusion presses and the like.

The worm screws of presses of the kind referred to are subjected to considerable wear, particularly at the front end owing to the amount of friction on that part as a result of the increase in the compression of the material being operated on toward the delivery end or mouth of the machine or press, consequently the front end of such worm screw wears away considerably quicker than the rear or back portion, or in fact, any other part of such worm screw. To prevent wear on the front end of worm screws, and so to obviate the necessity of discarding an entire worm screw because of its reduction in length consequent on wear, it is the practice to provide the front end of worm screws with a removable wearing cap or piece usually of hardened steel.

Wearing caps or pieces for the purposes mentioned have been secured to the boss-like end of the worm screws to cause them to rotate with the worm screws, by means of a key driven into a keyway in the worm screw shaft or spindle and into a corresponding key-way in the wearing cap or piece, and for the purpose of reducing the strain on the key, and on the key-way through the wearing cap or piece, and to further insure the wearing cap or piece rotating with the worm screw, such wearing cap or piece has been provided with holes to pass on to studs screwed or driven into the front of the boss formed on the front of the worm screw.

One disadvantage of the stud holes in the wearing cap or piece is, that when undue strain takes place on the studs and stud-holes, the stud holes are liable to burst owing to the small amount of metal that intervenes between the stud-holes and the hole through the center of the wearing cap or piece, with the result that the wearing cap or piece is liable to split and become useless.

A further disadvantage has been that the portion of the worm screw shaft having the largest diameter has hitherto projected through the wearing cap or piece, its front being level with the front or face of the wearing cap or piece, with the result that such shaft, which is ordinarily of mild steel, has worn as the wearing cap or piece has worn, the consequence being that after five or six wearing caps or pieces have been fitted to a worm screw and have worn away to the extent to be of no further use, the end of the thickest portion of the shaft has become so much worn and reduced in length that a new shaft has had to be fitted in the worm screw.

The present invention has for its object, an improved wearing cap or piece of the kind referred to but which will not only protect the front of the worm screw itself but will also protect the front of that part of the worm screw shaft which has the largest diameter, by covering the same and will so prevent wear on and reduction in the length of such shaft as to allow of its life being extended, and which can be fitted to the front of the worm screw and be caused to rotate therewith without the use of studs projecting from the boss of the worm screw and stud holes through the wearing cap or piece.

Figure 2:
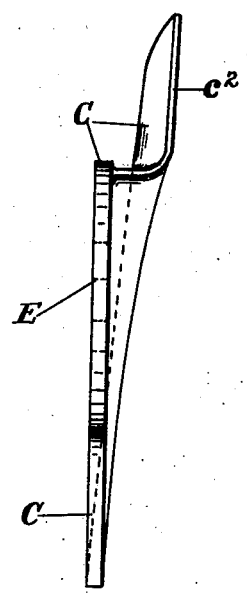
Figure 3:
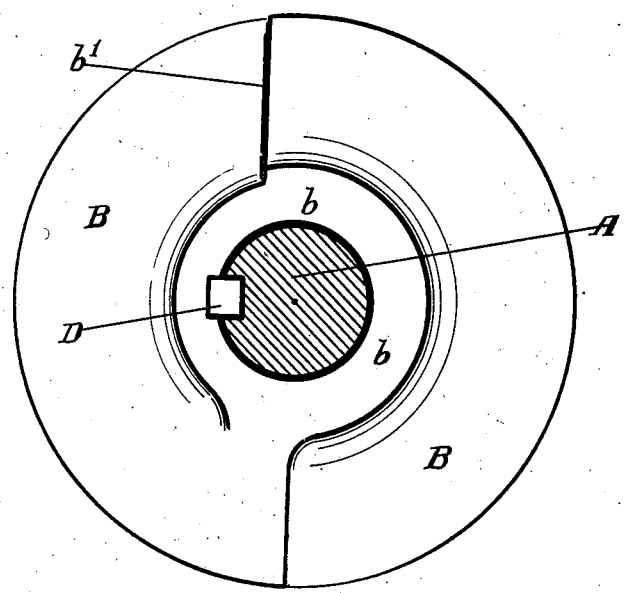
Figure 4:
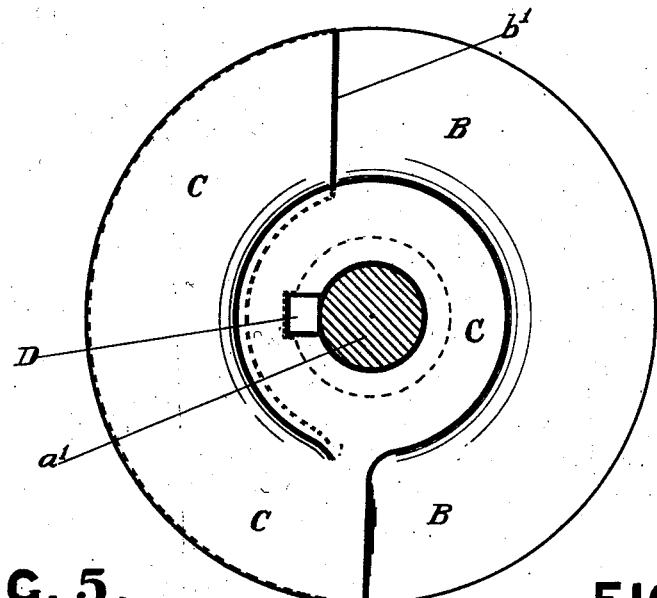
Figure 5:
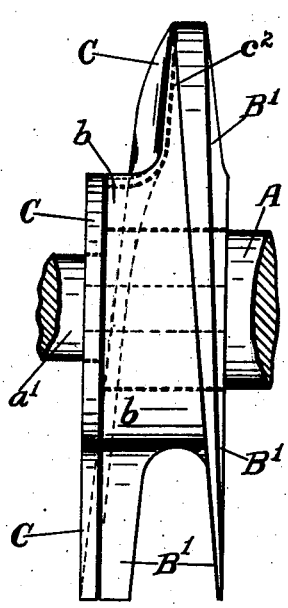
Figure 6:
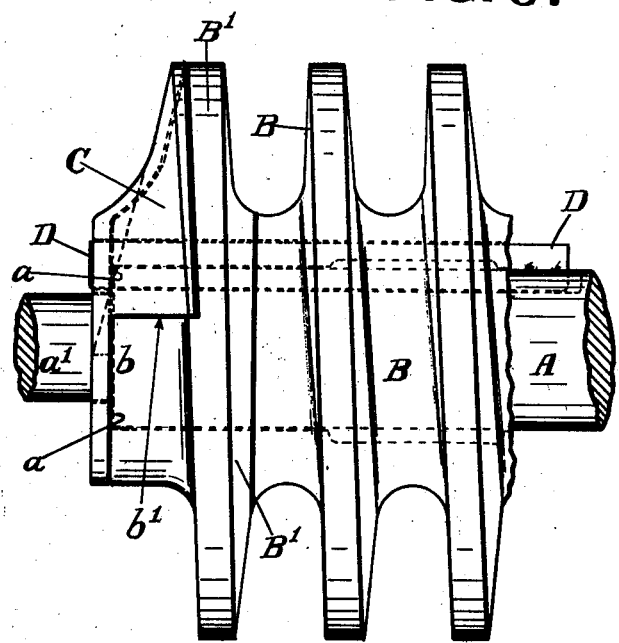

In order that my invention may be readily understood and carried into effect, I have appended hereunto, two sheets of explanatory drawings of which Figure 1 is a front view of a wearing cap or piece in accordance with my invention, for application to the front of a compressing worm screw; Fig. 2 represents a right hand end of Fig. 1, Fig. 3 is a front view of a worm screw showing the shoulder with which it is preferably provided for one end of the wearing cap or piece to abut against, Fig. 4 is a similar view to Fig. 3 but showing the wearing cap or piece applied thereto, Fig. 5 is a side view of Fig. 4, the portion of the worm screw shown being a short removable portion, and Fig. 6 is a side view of a portion of the worm screw with the removable portion of such worm screw in position and the wearing cap or piece applied thereto.

In carrying out my invention, I make the wearing cap or piece in the form of a suitably thick metal, preferably hardened steel, plate, the plate being so shaped by stamping or other suitable means, as to be adapted to fit the front end of the boss and a suitable portion of the front of the first coil of the worm screw, or of a removable front portion of the worm screw, such cap or piece being similar in these respects to wearing caps or pieces I have previously fitted to compressing worm screws.

According to the present invention, I make that portion of the spindle A of the worm screw B, which has the largest diameter and which has hitherto projected beyond the front of the boss $b$ on the front of the worm screw and through the wearing cap or piece to enable the wearing cap or piece to be passed thereonto, shorter than has hitherto been the practice so that the shoulder $a$ formed by the reduction in the diameter of such spindle does not project beyond but is flush with the front of the boss $b$ on the front of the worm screw, or on the front of a short removable portion of the worm screw, and I provide the wearing cap or piece C with a hole $c$ of only sufficient diameter to allow it to pass on to the reduced end $a^1$ of the worm screw spindle which enters the die plate or the like through which the material being compressed is extruded. By this means the shoulder $a$ formed by the reduction of the diameter of the worm screw spindle A is protected from the frictional action of the meal or material being compressed and consequently from wear, by the wearing cap or piece C when in position bedding on such shoulder and so covering the same instead of the end of the thickest portion of the spindle passing through the wearing cap or piece as heretofore and the thickest end or shoulder befrom the frictional action of the metal or other material being compressed and wearing away with the wearing cap or piece as has hitherto been the case.

Instead of securing the wearing cap or piece C on the worm screw spindle A by means of a small key and providing it with holes around the hole $c$ to receive studs screwed or driven into the front of the boss $b$ on the front of the worm screw, or on the front of a small removable portion of the worm screw, as has been previously proposed, I dispense with the studs on the boss of the worm screw or on the boss of a removable portion of the worm screw and the stud-holes through the wearing cap or piece which have caused considerable weakening of the wearing cap or piece, and secure the wearing cap or piece on the worm screw spindle A by means of a key or keys only, the key or keys being deeper and stronger than usual, the keyway or keyways in the worm screw spindle and in the wearing cap or piece being correspondingly deeper than hitherto to receive such key or keys, the drawing showing a spindle having one key D only and the wearing cap or piece having one keyway E only.

The front end of the worm screw, or of the removable front portion thereof, as the case may be, is preferably reduced slightly in thickness around a portion of its face, to provide a slight radial or like shoulder $b^1$ against which the end or edge $c^2$ of the wearing cap or piece C abuts to preserve the continuity of the first coil of the worm without the formation of a ledge which would in any way tend to obstruct the forward movement of the material being compressed, or which would in any way be liable to prevent free rotation of the compressing worm screw.

In the drawings the wearing cap or piece C is shown applied to a short removable portion $B^1$ of the worm screw B.

I claim:—

1. The combination, with a press screw, and its driving shaft; of a protecting cap for the front end of the screw, said cap comprising a hub plate which encircles the said shaft, and a spiral blade portion arranged at an angle to the said hub plate and fitting against the end of the thread of the screw.

2. The combination, with a press screw, and its driving shaft, said shaft having a shoulder and an end portion which projects beyond the shoulder and is of smaller diameter than its main portion; of a protecting cap for the end of the screw and the said shoulder, said cap comprising a hub plate which encircles the end portion of the said shaft and fits against its shoulder, and a spiral blade portion arranged at an angle to the said hub plate and fitting against the end of the thread of the screw.

3. The combination, with a press screw, and its driving shaft; of a protecting cap for the front end of the screw, said cap comprising a hub plate which encircles the said shaft, and a spiral blade portion arranged at an angle to the said hub plate and fitting against the end of the thread of the screw, and a key which secures together the said screw, shaft and hub plate.

In testimony whereof I affix my signature.

ALBERT WILLIAM SIZER.